3,328,486
COMPOSITIONS COMPRISING POLYETHYLENE AND AN ETHYLENE-PROPYLENE BLOCK COPOLYMER
John William Croom Crawford and William George Oakes, Welwyn Garden City, England, assignors to Imperial Chemical Industries Limited, London, England, a corporation of Great Britain
No Drawing. Filed May 16, 1962, Ser. No. 195,312
Claims priority, application Great Britain, May 18, 1961, 18,165/61
12 Claims. (Cl. 260—876)

This invention relates to compositions comprising polythene.

It has previously been proposed to form blends containing certain proportions of conventional, branched-chain polythenes, of the type produced by the polymerisation of ethylene at pressures exceeding 500 atmospheres, and linear polythenes of higher density produced at low temperatures and low pressures, for example by Ziegler-type polymerisation processes. In such blends a balance may be obtained between the better toughness (fracture resistance) of the low density polythenes and the higher stiffness of the high density polyethenes. It is found, however, that the fracture resistance of the blends imposes a practical limitation on the amount of high density material that can be added, and hence on the stiffness of the blend.

A combination of the improved stiffness characteristic of linear polythenes with the good toughness properties characteristic of branched-chain polythenes is also obtained in polythene produced by the high pressure process under conditions that discourage the formation of branches, more particularly by operating the polymerisation process at comparatively low temperatures or at very high pressures. Such polythene has been described as "intermediate density" polythene, being intermediate in density (and stiffness) between polythenes as normally produced by high pressure processes and those as normally produced by low pressure processes.

We have now found that if branched-chain polythenes are blended with certain copolymers of ethylene and propylene, it is possible to obtain combinations of stiffness and melt flow index equivalent to those obtained either with blends of polythenes or with "intermediate density" polythenes as described, but the deterioration of fracture resistance with increasing stiffness is markedly reduced as compared with either of those known materials.

The present invention provides a composition comprising polythene that has been prepared by polymerizing ethylene at a pressure above 500 atmospheres and has a density at 23° C. not greater than 0.935 and a melt flow index of from 0.1 to 100, and from 1% to 90%, by by weight of the composition, of a copolymer of ethylene and propylene this copolymer being a substantially hydrocarbon-insoluble block copolymer at 50° C. containing from 5% to 50% of ethylene, by weight of the copolymer, and containing at least two blocks selected from ethylene homopolymer, propylene homopolymer and ethylene/propylene random copolymer blocks.

As in all polymerisation processes, the product of a block copolymerisation process is not homogeneous in the sense of being completely composed of identical molecules. In the ordinary low pressure polymerisation of, for example, ethylene, there is a spread of molecular weights in the molecules of the product. In random copolymerisation each molecule of the product will differ from its neighbour in the exact number of molecules of each monomer from which it is formed and in the order in which they are arranged. In block copolymerisation there may be still further variations, in the number of blocks each polymer contains, and conceivably completely random copolymer molecules or even molecules containing one monomer only may be present. In this specification we do not wish to make any assumption about the molecular composition of the product of block copolymerisations. We therefore define block copolymeric materials as the products of a copolymerisation process in which the least two different monomers or monomer mixtures are brought into contact with a polymerisation catalyst, in rotation or in sequence.

Formation of block copolymers is carried out by sequential addition of the two monomers. Block copolymers containing "pure blocks" may be made by passing in the first monomer, polymerising for a short time, and then evacuating the reaction vessel or sweeping out any of the first monomer still remaining in a current of an inert gas such as nitrogen, before adding the next monomer and repeating the process. Copolymers containing "random blocks" may be made in a similar way by carrying out the above process omitting the evacuating or sweeping step; this will generally give rise to molecules containing "pure blocks" of two different monomers separated by "random blocks." The copolymers may however contain "pure blocks" of one monomer only separated by "random blocks." Such copolymers are sometimes produced when the evacuating or sweeping step is omitted, or may be produced by deliberately mixing the monomers; particularly useful materials are prepared by passing in propylene under pressure and injecting a shot or ethylene. The number of separate monomer additions in the process may be between 2 and 10 or higher. It will be realised that the many factors which can be varied give rise to an immense number of distinct possible processes.

The copolymer may thus, if desired, contain "pure blocks" of one or both monomers and random copolymer blocks comprising ethylene and propylene, or may consist substantially of homopolymer blocks. Generally, the presence of random copolymer blocks is desirable, since such copolymers tend to give tougher blends with polythene.

Block copolymers suitable for use in the compositions of the invention may be prepared by polymerising the monomers by introducing them alternately into the presence of a heterogeneous catalyst suitable for the preparation of polymers of propylene substantially insoluble in liquid hydrocarbons at 50° C. We prefer to use a catalyst that results in the production of such an insoluble polypropylene with a yield of less than 10% of polypropylene soluble in liquid hydrocarbons at 50° C. Such catalysts are compounds, normally the halides, of metals of subgroups IVa, Va and VIa of the periodic classification, as set out in Ephraim's Text Book of Inorganic Chemistry (published by Gurney and Jackson in 1934) at page 24, these metals having less than their maximum valency and the compounds being activated by a hydrocarbon derivative of a non-transition metal. Particularly effective catalysts are trivalent halides, for example chlorides, or titanium activated by hydrocarbon derivatives of aluminium, for example aluminium derivatives of the lower alkyls of up to five carbon atoms, such as aluminium triethyl and aluminium diethyl chloride.

If "pure blocks" only are desired in the copolymer, then each monomer is removed by evacuation of the polymerisation vessel, or allowed to polymerise until the pressure has dropped substantially to a vacuum, before the second monomer is admitted, so that appreciable mixing of the monomers between the homopolymerisation steps is avoided. If intervening random copolymer blocks are desired, introduction of the second monomer of a cycle is begun without the complete removal of the first monomer, so that the mixed monomers are subjected to polymerisation conditions during a part or parts of the cycle. The term "cycle" will be used herein to describe one complete sequence of operation, beginning from the start of introduction of one allotment of the first monomer and ending with the completion of the introduction of the following allotment of the second monomer.

Ethylene/propylene copolymers that have been found to give particularly useful compositions in accordance with the present invention are those containing not more than 40% of ethylene by weight and formed by a process consisting of from 1 to 10 cycles; these copolymers may contain random blocks as described above. The melt flow index of the copolymer is preferably from 0.06 to 2 and the solubility in n-heptane at 50° C. preferably does not exceed 7% by weight.

The compositions generally giving the best combination of stiffness, melt flow index and fracture resistance are those containing at least 10%, and particularly from 30% to 60%, of the copolymer by weight. For ease of working, the composition preferably has a melt flow index of from 0.1 to 20, which can be provided by selection of a suitable copolymer for blending with a particular polythene. We have found, however, that proportions of copolymer of from 5% to 10%, by weight of the composition, can provide a marked improvement in flow properties, especially the extrudability, of the polythene, particularly when the polythene has a low melt flow index; a significant improvement is obtained even with amounts of copolymer as low as 1% by weight, and even when blending results in little, if any, alteration of the melt flow index of the polythene. The presence of the block copolymers, particularly when present at concentrations of between 1 and 10% of the composition, reduces the degree of the defect of elastic turbulence of the polythene during extrusion. This defect is more pronounced with high viscosity polythenes, especially those having a melt flow index of less than 1, during high speed extrusion such as is used in covering telephone distribution line wires.

The method used for determination of melt flow index for the purposes of this invention is that described in British Standards Specification 2782: Part 1: 1956 "Melt Flow Index of Polythenes and Polythene Compounds." The fracture resistance of polythenes including the effect of density, and testing methods is discussed in "Plastics," vol. 24, 1959, pp. 31–36.

The combination of good flow properties, stiffness and fracture resistance possessed by the compositions of this invention makes them particularly suitable for use in the production of film, sheet, pipe, cable sheathing, and moulded articles, including blow-moulded articles. The compositions may contain ancillary ingredients appropriate to their proposed application.

Our invention is illustrated but in no way limited by the following examples, in which all parts and percentages given are by weight.

*Example 1*

As a catalyst for the production of the block copolymer, a slurry of $TiCl_3$ was prepared by reducing $TiCl_4$ by adding it slowly to a sirred solution of aluminum sesquichloride in a saturated hydrocarbon fraction (boiling range 200–240° C.) at 0° C. The slurry obtained was heated slowly to 85° C. and held at this temperature for 4 hours, and was then cooled to room temperature. The precipitate, which was used as $TiCl_3$, was washed three times and finally reslurried in further diluent.

A block copolymer was prepared in a 2-litre round-bottomed flask, fitted with dip-leg, stirrer and thermometer, placed in a water-bath at 50° C. 1 litre of nitrogen-purged diluent (the same saturated hydrocarbon fraction) was run into the flask and 0.02 mole of $AlEt_2Cl$ and 0.01 mole of the $TiCl_3$ were added with stirring. When the contents of the flask had heated up to 50° C. the nitrogen in the flask was evacuated and replaced by propylene.

The propylene feed was arranged to maintain the reaction flask at a pressure 2 cm. above that of the atmosphere. 12 g. of propylene were allowed to polymerise after which the feed was stopped and the flask was evacuated. 1.6 g. of ethylene were then introduced into the flask and polymerised until the pressure in the flask dropped again to a vacuum. This completed one cycle.

The vacuum was again released with propylene and polymerisation carried on for another six cycles, making a total of seven.

The catalyst in the resulting slurry was killed with 20 ml. of butanol and the slurry was filtered. The insoluble material was washed twice with petroleum ether and twice with acetone, and then dried. The reaction yielded 85 g. of dry insoluble polymer (melt flow index 0.1) and 3 g. of heptane-soluble polymer. The ethylene content determined by infra-red spectroscopy was 13.6%.

A portion of the insoluble polymer was milled with stabilizer and pressed at 190° C. to form a sheet. The sheet had a flexural modulus of $1.4 \times 10^5$ p.s.i. and a fracture resistance of less than 20%, measured 1 day after moulding.

60 parts of polythene having a density of 0.919 and a melt flow index of 2.0 were then blended, on mill rolls at 175° C., with 40 parts of the insoluble block copolymer.

The resulting blend was found to have a melt flow index of 0.5, a flexural modulus of $6.6 \times 10^4$ p.s.i., a fracture resistance of 45% and impact energy of 1.7 cm. kg. By comparison, a low density/high density polythene blend of similar melt flow index and flexural modulus had a fracture resistance of only 7% and an impact energy of 0.4 kg. cm.

*Examples 2–6*

Similarly, blends of other polythenes and propylene/ethylene copolymers were prepared and tested as described in Example 1. The results are summarised in the table. In these examples, specimen sheets were pressed at 175° C. and their properties were tested two weeks later.

*Examples 7–10*

A $TiCl_3$ catalyst was prepared as described in Example 1.

A 20 gallon autoclave was charged with 73 litres of diluent (a saturated hydrocarbon fraction of boiling range 200–240° C.), brought to a temperature of 50° C., and then held under vacuum for 12 minutes. The vacuum was released with propylene, and $AlEt_2Cl$ (20 millimoles/litre) and the $TiCl_3$ catalyst (10 millimoles/litre) were added.

75 lbs. of propylene (i.e. 46 gm. of propylene/litre diluent) were charged into the autoclave at 6.5 lbs./hr., after which the pressure dropped owing to polymerisation. When the pressure reached 0 p.s.i.g., 0.77 lb. of ethylene (4.7 g./litre diluent) were added; the ethylene polymerised rapidly. Propylene was re-introduced when the pressure again dropped to 0 p.s.i.g. and the cycle was repeated three more times. At the end of the polymerisation the catalyst was killed with butanol, and the polymer was de-ashed. The polymer was filtered off, subjected to steam distillation, and dried.

Because in the production of the copolymer the pressure was not reduced to a vacuum between the polymerisation of one monomer and the introduction of the other monomer, some random copolymerisation of the monomers was allowed to take place.

Blends of the copolymer with polythene were prepared and tested, with the results shown in the table. It will be seen that each blend had a better fracture resistance and higher impact energy than a blend of high density and low density polythene with the same melt index and modulus.

| Ex. | Polythene | | Propylene/Ethylene Copolymer | | | | Blend | | | | | | | Comparable HD/LD Blend | |
|---|---|---|---|---|---|---|---|---|---|---|---|---|---|---|---|
| | M.F.I. | Flexural Modulus, p.s.i. | Percent C₂ | No. of cycles | M.F.I. | Flexural Modulus, p.s.i. | Parts by weight Polythene | Parts by weight Copolymer | M.F.I. | Flexural Modulus, p.s.i. | Impact Energy, cm. kg. | Fracture Resistance, Percent | Fracture Resistance, Percent | Impact Energy, cm. kg. |
| 2 | 2 | 20,000 | 13.6 | 7 | 0.1 | 165,000 | 40 | 60 | 0.3 | 93,000 | 2.4 | 30 | 25 | 0.4 |
| 3 | 2 | 20,000 | 11.4 | 10 | .06 | 182,000 | 50 | 50 | 0.6 | 78,000 | 1.8 | 30 | 20 | 0.4 |
| 4 | 2 | 20,000 | 11.9 | 12 | 0.3 | 100,000 | 50 | 50 | 0.8 | 60,000 | 2.0 | 60 | 40 | 1.3 |
| 5 | 20 | 16,000 | 13.6 | 7 | 0.6 | 130,000 | 70 | 30 | 5.0 | 58,000 | 1.6 | 55 | 30 | 1.3 |
| 6 | 20 | 16,000 | 13.6 | 7 | 0.6 | 130,000 | 50 | 50 | 4.0 | 89,000 | 0.7 | 10 | 0 | 0.2 |
| 7 | 20 | 25,000 | 6.8 | 4 | 0.6 | 120,000 | 40 | 60 | 2.3 | 71,000 | 1.6 | 40 | 15 | 0.6 |
| 8 | 20 | 16,000 | 6.8 | 4 | 0.6 | 120,000 | 30 | 70 | 0.9 | 77,000 | 1.6 | 40 | 10 | 0.4 |
| 9 | 20 | 16,000 | 9.4 | 2 | 0.4 | 103,000 | 30 | 70 | 1.4 | 79,000 | 1.2 | 40 | 10 | 0.4 |
| 10 | 20 | 16,000 | 4.5 | 1½ | 0.04 | 133,000 | 50 | 50 | 2.3 | 58,000 | 1.2 | 35 | 25 | 1.0 |

*Example 11*

5 parts of a 1 cycle random block ethylene-propylene copolymer containing 12% ethylene were blended with 95 parts of a polythene of melt flow index 0.3 and density 0.923 gm./cc. The melt flow index of the polythene was not significantly altered by the addition of the copolymer, but, in a laboratory test simulating conditions used in high speed wire coating, the rate of extrusion obtained for a given degree of elastic turbulence was increased by more than a factor of 10.

In addition, we have found that the environmental stress crack resistance of some polythenes can be improved by the presence of the ethylene-propylene block copolymers. Out of nine specimens of a polythene of melt index 0.43 and density 0.922 gm./cc. tested according to the method A.S.T.M. D1693-60T, with the exception that the samples were tested without conditioning, using an ionic detergent, nine specimens had broken after 200 hours. When 10% of a random block ethylene-propylene copolymer containing 6% ethylene was incorporated into this polythene, no specimens had broken in this time.

We claim:

1. A composition comprising polythene that has been prepared by polymerising ethylene at a pressure above 500 atmospheres and has a density at 23° C. not greater than 0.935 and a melt flow index of from 0.1 to 100, and from 1% to 90%, by weight of the composition, of a copolymer of ethylene and propylene, this copolymer being a substantially hydrocarbon-insoluble block copolymer at 50° C. containing from 5% to 50% of ethylene, by weight of the copolymer, and containing at least two blocks selected from ethylene homopolymer, propylene homopolymer, and ethylene/propylene random copolymer blocks.

2. A composition as claimed in claim 1 in which the copolymer contains both ethylene and propylene homopolymer blocks.

3. A composition comprising polythene that has been prepared by polymerising ethylene at a pressure above 500 atmospheres and has a density at 23° C. not greater than 0.935 and a melt flow index of from 0.1 to 100, and from 1% to 90% by weight of the composition, of a block copolymer of ethylene and propylene, containing from 5% to 50% of ethylene, by weight of the copolymer, said copolymer having been prepared by polymerising the monomers by introducing them alternately into the presence of heterogeneous catalyst suitable for the preparation of polymers of propylene insoluble in liquid hydrocarbons at 50° C.

4. A composition as claimed in claim 3 in which the copolymer has been prepared by polymerising the monomers by introducing them alternately into the presence of the catalyst and preventing appreciable mixing and polymerisation of the monomers between the homopolymerisation steps.

5. A composition as claimed in claim 3 in which the copolymer has been prepared by polymerising the monomers by introducing them alternately into the presence of the catalyst, but allowing mixing of the monomers during part or parts of the polymerisation cycle.

6. A composition as claimed in claim 3 in which the copolymer has been prepared in the presence of a catalyst comprising a compound of a metal selected from the group consisting of sub-group IVa, Va and VIa of the Periodic Classification, the metal having less than its maximum valency and the compound being activated by a hydrocarbon derivative of a non-transition metal.

7. A composition as claimed in claim 3 in which the copolymer contains not more than 40% of ethylene by weight and has been formed by a process consisting of from 1 to 10 polymerisation cycles in which a polymerization cycle is one complete sequence of operation beginning from the start of introduction of an allotment of a monomer for forming one block and ending with the introduction of the monomer which is introduced alternately therewith.

8. A composition as claimed in claim 1 in which the copolymer has a melt flow index of from 0.06 to 2 and its solubility in n-heptane at 50° C. does not exceed 7% by weight.

9. A composition as claimed in claim 1 that contains at least 5% by weight of the copolymer.

10. A composition as claimed in claim 9 that contains at least 10% by weight of the copolymer.

11. A composition as claimed in claim 10 that contains from 30% to 60%, by weight, of the copolymer.

12. A composition as claimed in claim 1 having a melt flow index of from 0.1 to 20.

References Cited

UNITED STATES PATENTS 3,176,052  3/1965  Peticolas ———————— 260—897
3,262,992  7/1966  Holzer et al. ———————— 260—896

FOREIGN PATENTS 538,782  12/1955  Belgium.
594,018  5/1959  Italy.
1,240,852  8/1960  France.

MURRAY TILLMAN, *Primary Examiner.*

DONALD E. CZAJA, GEORGE F. LESMES, J. A. KOLASCH, *Assistant Examiners.*